United States Patent [19]

Kato et al.

[11] Patent Number: 4,851,948
[45] Date of Patent: Jul. 25, 1989

[54] DISK CARTRIDGE WITH SHUTTER BIASING DEVICE

[75] Inventors: Yoshitake Kato, Ibaraki; Minoru Fujita, Toride, both of Japan

[73] Assignee: Hitachi Maxell, Ltd., Ibaraki, Japan

[21] Appl. No.: 155,482

[22] Filed: Feb. 12, 1988

[30] Foreign Application Priority Data

Feb. 13, 1987 [JP]  Japan .................................. 62-29887
Jul. 6, 1987 [JP]  Japan ................................ 62-167106

[51] Int. Cl.⁴ ............................................ G11B 23/03
[52] U.S. Cl. .................................................... 360/133
[58] Field of Search ................ 360/133; 369/282, 273; 206/444

[56] References Cited

U.S. PATENT DOCUMENTS 4,589,105  5/1986  Nemoto ........................... 360/133 X Primary Examiner—A. J. Heinz
Attorney, Agent, or Firm—Antonelli, Terry & Wands

[57] ABSTRACT

A disk cartridge comprises a cartridge casing having a head entry aperture, a disk recording medium rotatably accommodated in the cartridge casing, a shutter for opening/closing the head entry aperture, and a spring member for resiliently biasing the shutter in the closing direction. The spring member includes a proximal end portion engaged with the cartridge casing, a resilient end portion engaged with the shutter, and an intermediate engaging portion provided between the proximal end portion and the resilient end portion, a displacement-preventing portion is provided in an area where the intermediate engaging portion is passed upon an opening/closing operation of the shutter, and the intermediate engaging portion is adapted to be brought into contact with the displacement-preventing portion, thereby canceling a force of the spring member to spring out or fall in, and enabling to enhance reliability.

8 Claims, 19 Drawing Sheets

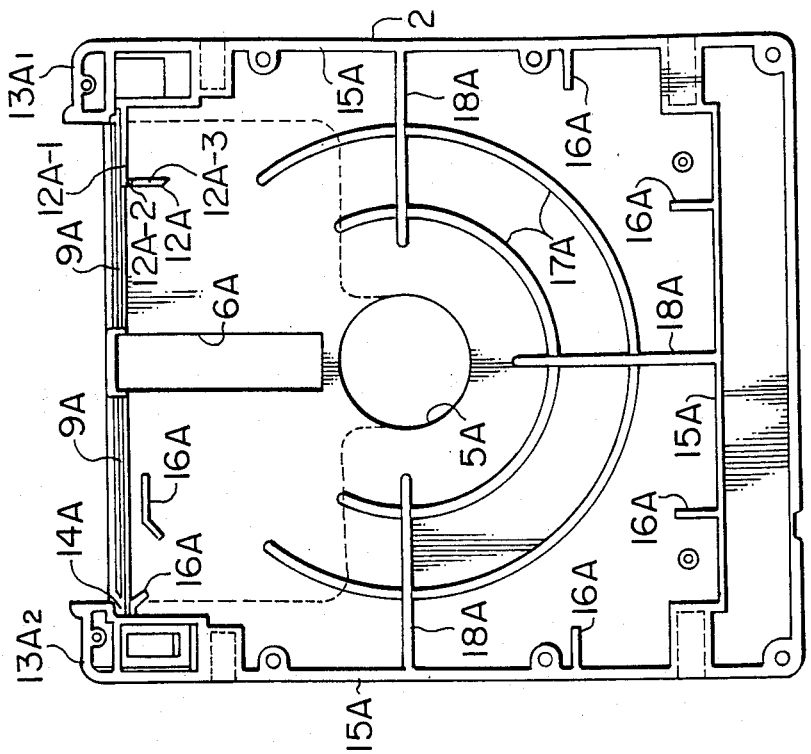

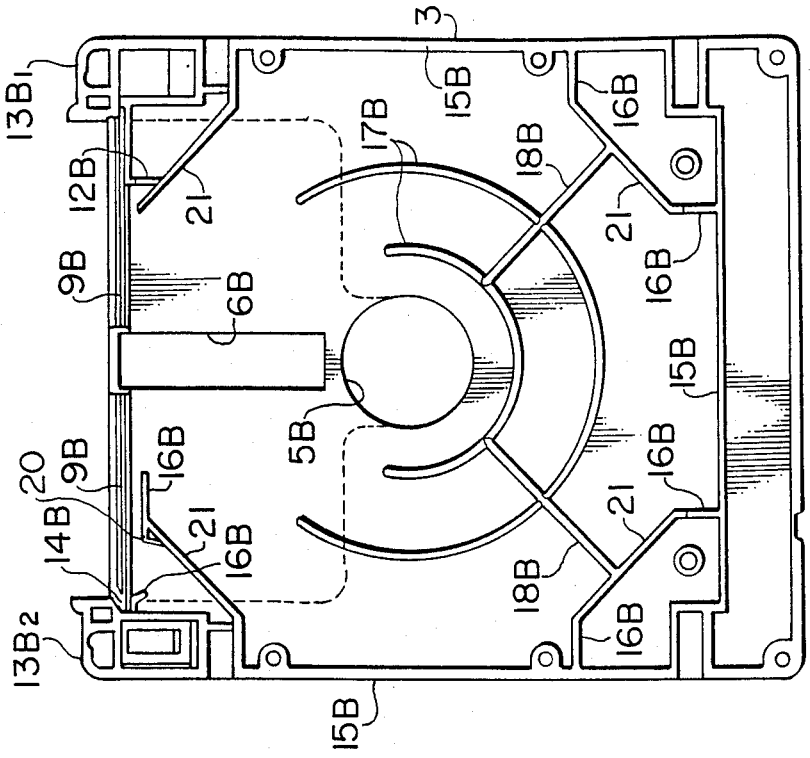
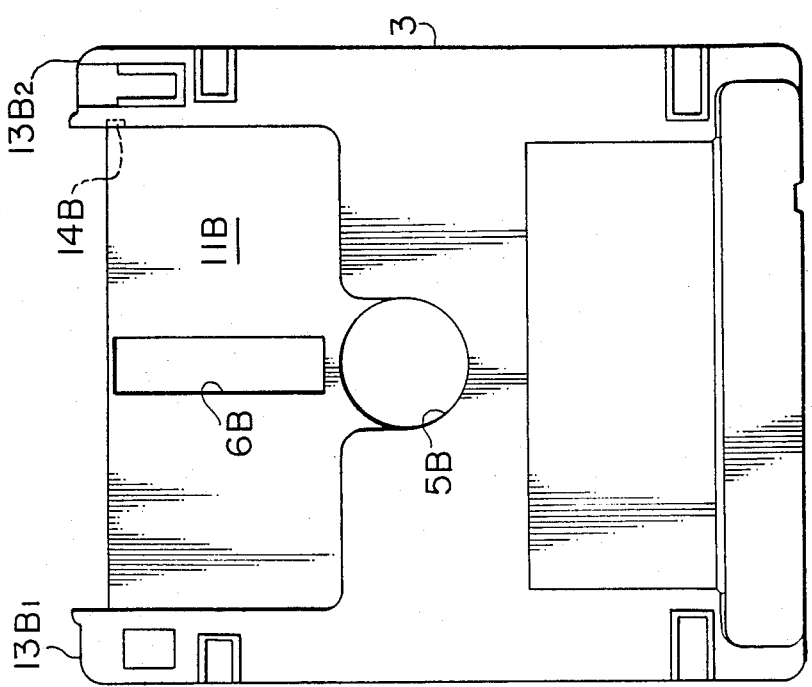

DISK CARTRIDGE WITH SHUTTER BIASING DEVICE

BACKGROUND OF THE INVENTION

1. Field of the Invention

The present invention relates to a disk cartridge such as a magnetic disk cartridge, an optical disk cartridge, or a photomagnetic disk cartridge, and, more particularly, relates to a shutter mechanism for opening and closing head inserting apertures or read-write windows formed in a cartridge casing.

2. Description of the Related Art

For ease in handling, protection from dust and other purposes, a recording medium in the form of a disk, such as a magnetic disk or an optical disk, is loaded in a recording and reproducing apparatus for recording/reproducing information on/from the recording medium in a state in which the recording medium is accommodated in a cartridge casing. For this purpose, the cartridge casing is provided with head entry apertures or read-write windows to allow a head to access the disk recording medium when the cartridge casing is set in the recording and reproducing apparatus.

However, the head entry aperture thus provided may allow dust or the like to enter the cartridge casing and to adhere to a recording surface of the recording medium when the disk cartridge is not being used. In addition, when the disk cartridge is being handled, fingers or the like may possibly touch the recording surfaces of the disk cartridge through the head entry apertures. Consequently, dust, grease or the like could adhere to the recording surface, thereby making it impossible to effect favorable recording and reproduction. For this reason, the disk cartridge is usually provided with a shutter which closes the head entry holes when the disk is not being used.

FIG. 33 is a top plan view of an upper casing used in a conventional disk cartridge, while FIG. 34 is a front elevational view of the disk cartridge.

As shown in FIG. 34, a pair of slits 24 are formed separately on left- and right-hand sides of an end surface of a cartridge casing 1 comprising an upper casing member 2 and a lower casing member 3. These slits 24, 24 open to parts of a pair of triangular spring accommodating portions 23, 23 (see FIG. 33) formed inside the cartridge casing 1, and spring members are respectively inserted into and disposed in the spring accommodating portions 23, 23, as will be described later.

FIG. 35 is a diagram illustrating the relationship of engagement among the cartridge casing 1, a shutter 7, and spring members 25, 25.

As shown in the drawing, the shutter 7 is positioned at a substantially central portion of the cartridge casing 1 in such a manner that head entry apertures 6A, 6A in the cartridge casing 1 are closed by a closing cover portion 29. A pair of spring members 25, 25 are respectively disposed in the pair of spring accommodating portions 23, 23 (see FIG. 33) provided on both sides of the shutter 7. As shown in FIG. 36, the spring member 25 is a torsion coil spring having a coil portion 25A, a pair of arms 25B, 25B', and a pair of abutting portions 25C, 25C' respectively bent from the arms 25B, 25B'. In a state in which each of the spring member 25 is disposed in the cartridge case 1, as shown in FIG. 35, one of the abutting portions 25C, 25C' is engaged with a recess 14A (see FIG. 33) of the spring accommodating portion 23, while the other is engaged with a spring-engaging portion provided on a side surface of the shutter 7 or a stopper provided in the cartridge casing 1 (neither are shown).

This conventional disk cartridge is arranged such that the coil portion 25A of each spring member 25 is not fixed to the cartridge casing 1 and is movable inside the spring accommodating portion 23. For this reason, forces constantly act on the abutting portions 25C, 25C' of the spring member 25 in the sliding direction of the shutter 7. Consequently, the overall spring member 25 is constantly biased by a component of the force in the direction from the spring accommodating portion 23 toward the slit 24 (see FIG. 34), i.e., in the direction of springing out to the outside. Of the abutting portions 25C, 25C' of each of the spring members 25 disposed in the spring accommodating portions 23, the length of the one which is not engaged with a recess 14A (see FIG. 33) is made greater than the length of the slit 24, and the arrangement is such that said one abutting portion 25C or 25C' of the spring portion 25 bears against a front edge projection of the upper casing 2 and the lower casing 3 defining the slit 24.

However, if the slit 24 is expanded artificially or by some cause or other, forces restricting the spring member 25 disappear with the result that the spring member 25 disadvantageously springs out from the spring accommodating portion 23.

SUMMARY OF THE INVENTION

Accordingly, the object of the present invention is to provide a highly reliable disk cartridge which is capable of preventing the springing out or springing in of the spring member, thereby overcoming the above-described drawback of the prior art.

To this end, according to the present invention, there is provided a disk cartridge comprising a cartridge casing having a head entry aperture, a disk recording medium rotatably accommodated in the cartridge casing, a shutter for opening/closing the head entry aperture, and a spring member for resiliently biasing the shutter in the closing position, wherein the spring member includes a proximal end portion engaged with the cartridge casing, a resilient end portion engaged with the shutter, and an intermediate engaging portion provided between the proximal end portion and the resilient end portion, a displacement-preventing portion is provided in an area where the intermediate engaging portion is passes during an opening/closing operation of the shutter, and the intermediate engaging portion is adapted to be brought into contact with the displacement-preventing portion, thereby canceling a force of the spring member to spring out or fall in.

BRIEF DESCRIPTION OF THE DRAWINGS

The foregoing and other objects and features as well as the advantages of the present invention, will be made clearer from the following more particular description of preferred embodiments referring to the accompanying drawings.

FIGS. 1 to 15 are related to a disk cartridge according to a first embodiment of the present invention, in which FIGS. 1 and 2 are a top plan view and a bottom plan view, respectively, of an upper casing member of the disk cartridge;

FIGS. 3 and 4 are a bottom plan view and a top plan view, respectively, of a lower casing member of the disk cartridge;

FIGS. 5 and 6 are a top plan view and a front elevational view, respectively, of the cartridge casing;

FIGS. 7 to 9 are a top plan view, an end plan view, and a side elevational view, respectively, of a shutter of the disk cartridge;

FIG. 10 is an enlarged fragmentary top plan view of the cartridge casing with the shutter and spring members mounted therein;

FIG. 11 is an enlarged, fragmentary view illustrating the relationship of engagement among the cartridge casing, the shutter, and the spring member;

FIGS. 12 to 14 are, respectively, an enlarged fragmentary top plan view, an end elevational view, and an enlarged fragmentary side elevational view, partly in section, illustrating the relationship of engagement between the shutter and the cartridge casing;

FIG. 15 is an enlarged fragmentary view illustrating a method of mounting the spring member in the cartridge casing;

FIGS. 19 to 30 are related to a disk cartridge in accordance with a second embodiment of the present invention, in which FIG. 19 is a top plan view of the disk cartridge;

FIGS. 20 and 21 are a top plan view and a bottom plan view, respectively, of the upper casing member of the disk cartridge;

FIG. 22 is a bottom plan view of the upper casing member with a pressing plate mounted therein;

FIG. 23 is a bottom view of the upper casing member with a cleaning sheet fusion-bonded thereto by heating;

FIG. 24 is a top plan view of the lower casing member of the disk cartridge;

FIG. 25 is a top plan view of the lower casing member with the pressing plate mounted thereon;

FIG. 26 is a top plan view of the lower casing member with the cleaning sheet fusion bonded to thereto by heating;

FIG. 27 is a bottom plan view of the lower casing member;

FIG. 28 is a top plan view of the pressing plate;

FIG. 29 is a cross-sectional view taken along the line XXIX—XXIX of FIG. 28;

FIG. 30 is an enlarged, fragmentary view illustrating states of displacement of the spring member;

DESCRIPTION OF THE PREFERRED EMBODIMENTS

Figure 5:
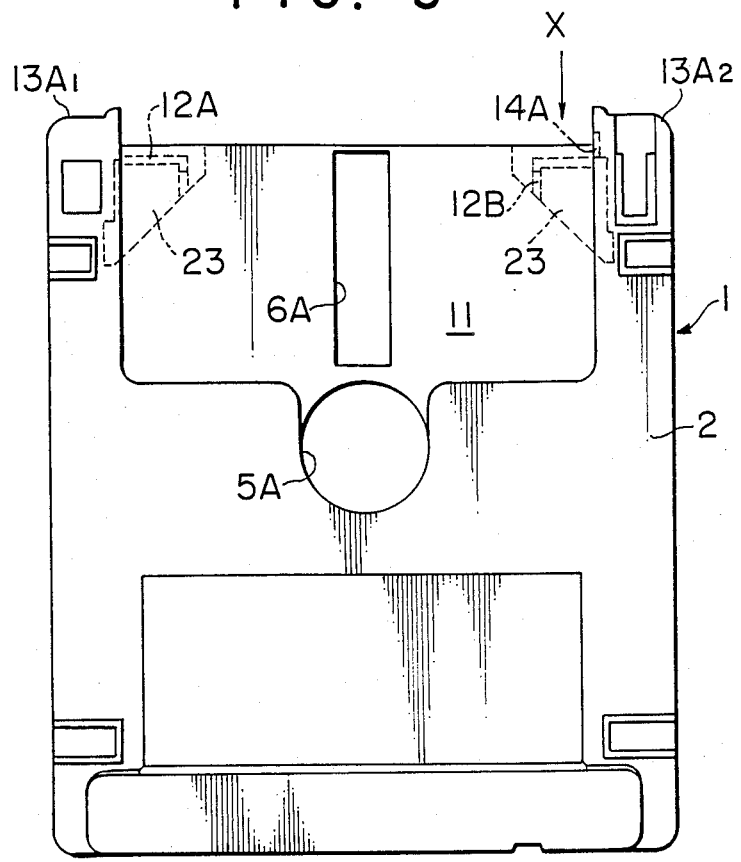

Referring now to the accompanying drawings, description will be given of the embodiments of the present invention.

FIGS. 1 to 15 are schematic diagrams illustrating a disk cartridge and component(s) thereof according to a first embodiment of the present invention.

First, description will be given of a cartridge casing used in this embodiment. FIG. 1 is a top plan view of an upper casing member; FIG. 2 is a bottom plan view of the upper casing member; FIG. 3 is a bottom plan view of a lower casing member; and FIG. 4 is a top plan view of the lower casing member. A disk cartridge in accordance with this embodiment has the following components or portions: an upper casing member 2, a lower casing member 3, spindle holes 5A, 5B, head entry apertures or read-write windows 6A, 6B, guide grooves 9A, 9B, shutter slide portions 11A, 11B, abutting ribs 12A, 12B, forward right corners $13A_1$, $13B_1$, forward left corners $13A_2$, $13B_2$, recesses 14A, 14B, side walls 15A, 15B, walls 16A, 16B, arcuate ribs 17A, 17B, radial ribs 18A, 18B, and partition walls 21.

In FIG. 1, the spindle hole 5A is provided substantially in a central portion of the upper casing member 2, and the head entry aperture 6A is formed in the front or forward side, in view of loading the casing 1, (upwardly as viewed in the drawing) of the upper casing member 2 with respect to the spindle hole 5A.

As shown in the same drawing, the shutter slide portion 11A, which is planar and slightly recessed below other portions, is provided on an external surface of the upper casing 2 forwardly of the spindle hole 5A. This shutter slide portion 11A is substantially rectangular and includes the head entry aperture 6A. As shown in FIG. 2, the guide grooves 9A, 9A extending toward opposite sides of the upper casing member 2 are formed on the reverse side of the shutter slide portion 11A, i.e., on the internal surface side of the upper casing member 2, in the vicinity of a front end surface thereof. An upper portion of this groove 9A, as viewed in the FIG. 2, forms a perpendicular wall surface, while a lower portion thereof forms a tapered or inclined wall surface.

A plurality of the arcuate ribs 17A are provided on the internal surface of the upper casing member 2 concentrically with the spindle hole 5A, and a plurality of the radial ribs 18A are also provided on the internal surface of the upper casing member 2 so as to project from the side walls 15A radially inwardly with respect to the spindle hole 5A. The height(s) of these arcuate ribs 17A and the radial ribs 18A is less than that of the side wall 15A. In addition, the abutting rib 12A, formed by a portion extending along the groove 9A and a portion perpendicular to the same, is provided in the vicinity of the forward right corner $13A_1$. The portion 12A-1 of the abutting rib 12A extending along the groove 9A and a part 12A-2 of the portion thereof perpendicular to the same are tapered in the same, direction as the tapered wall surface of the groove 9A, while the remainder of the perpendicular portion 12A-3 is flat. Furthermore, the wall 16A, having a bent configuration, is provided adjacent to the forward left corner $13A_2$ As shown in FIGS. 3 and 4, the external and internal surfaces of the lower casing member 3 are formed or shaped almost the same as those of the upper casing member 2. Therefore, the portions of the casing shown in FIGS. 3 and 4 are indicated by the notation in which "A" in each reference symbol in FIGS. 1 and 2 is replaced with "B", and a detailed description of these portions is omitted.

As shown in FIG. 4, however, the internal surface of the lower casing member 3 is provided with the partition walls 21 connected to the ends of the walls 16B projecting from the side walls 15B in such a manner that the partition walls 21 isolate the four corner portions of the lower casing member 3. These partition walls 21 are higher than the side walls 15B and the walls 16B. In addition, the abutting rib 12B, similar to the rib 12A shown in FIG. 2, is provided in a portion surrounded by the forward right corner 13B1 and the partition wall 21, and the wall 16B, similar to the wall 16A shown in FIG. 2, is provided adjacent to the forward left corner 13B2.

The disk recording medium is disposed so as to face the internal surface of the lower casing member 3, and the upper casing member 2 is superposed on the lower casing member 3 in a manner such that the internal surface of the upper casing member 2 faces that of the lower casing member 3 and such that the periphery of the upper casing member 2 bears against that of the lower casing member 3. The partition walls 21 on the internal surface of the lower casing member 3 are thereby made to fit between the ends of the walls 16A and the side walls 15A of the upper casing member 2, or between two ends of the walls 16A, and the upper and lower casing members 2 and 3 are integrally fixed or adhered to each other by ultrasonic heating, thereby obtaining the cartridge casing member 1.

The upper and lower casing members 2, 3 are, then, brought into close contact with each other at the side walls 15A, 15B and face each other with small clearances between the walls 16A and 16B and between the partition walls 21 of the lower casing member 3 and the internal surface of the upper casing member 2. In addition, the abutting rib 12A provided on the upper casing member 2 does not abut the internal surface of the lower casing member 3, but there is a clearance left therebetween. Similarly, the abutting rib 12B provided on the lower casing member 3 does not abut the internal surface of the upper casing member 2, but there is a clearance therebetween.

Figure 6:
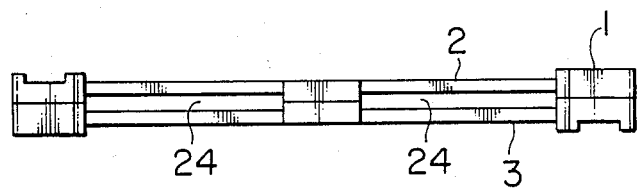
Figure 36:
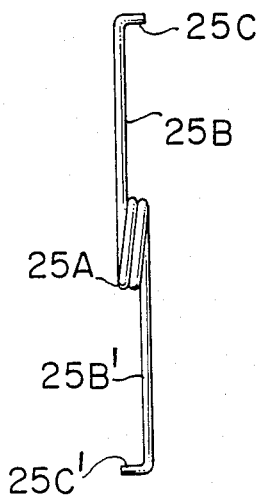
FIG. 36 is a side elevational view illustrating an example of the spring member.

FIG. 5 illustrates a top plan view of the cartridge casing member 1 thus constructed, while FIG. 6 is a front elevational view of the cartridge casing member 1. As shown in FIG. 6, the slits 24, 24 are respectively separately formed in the end surface of the cartridge casing member 1 on the left-and right-hand sides thereof. These slits 24, 24 partially open to the triangular spring accommodating portions 23, 23 formed on the outside of the partition walls 21, 21 (see FIG. 4), and the abutting ribs 12A, 12B are situated in these spring accommodating portions 23, 23. The spring members 25, 25 shown in FIG. 36 are inserted and disposed in the portions 23, 23.

Figure 7:
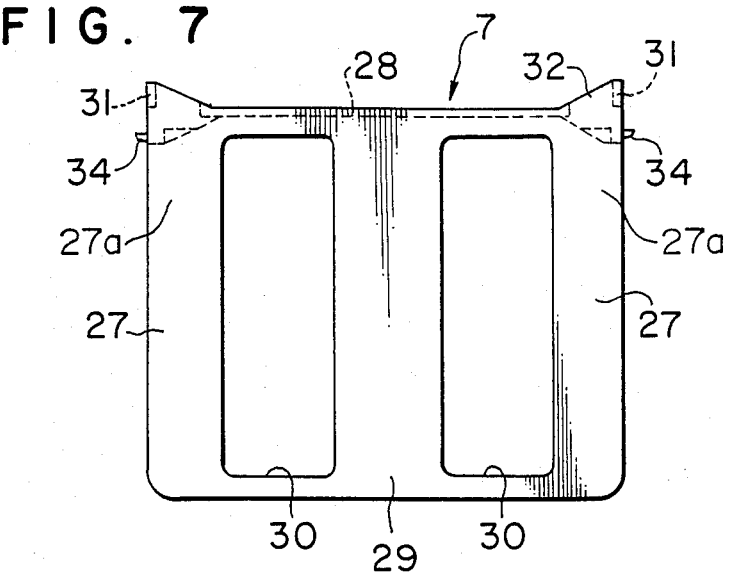
Figure 8:
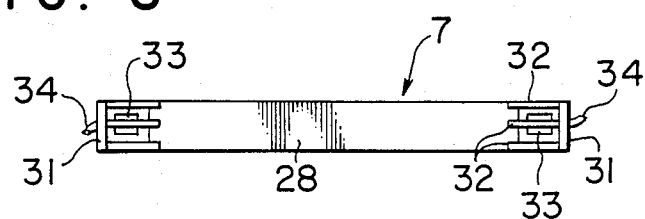
Figure 9:
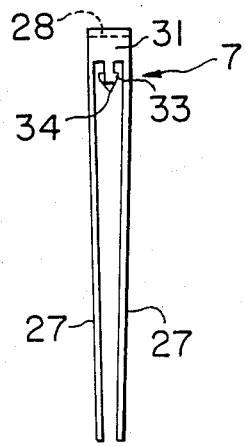

FIGS. 7 to 9 are a top plan view, an end plan view, and a side elevational view, of the shutter 7.

In these drawings, shutter surface portions 27, 27, provided such as to face each other, are connected to each other by a connecting portion 28 and together form a configuration of a substantially U-shaped side surface. As shown in FIG. 7, a closing cover portion 29 is provided at a central portion of each shutter surface portion 27, and openings 30 are provided on both sides thereof. In addition, as shown in FIGS. 8 and 9, abutting portions 31, 31, against which a shutter opening member of the recording and reproducing apparatus abuts, are formed at upper opposite ends of the shutter surface portions 27. These abutting portions 31, 31 are respectively reinforced by three substantially triangular reinforcing plate portions 32 provided at inner sides thereof.

Each intermediate reinforcing plate portion 32 extends downwardly in FIG. 7, i.e., toward the bodies 27a of the shutter surface portions 27, to form an engaging or retaining pawl 33. Each spring engaging or retaining portion 34 is provided at one end of each of the engaging or retaining pawls 33 to project from the corresponding side edge portions of the shutter surface portions 27.

FIGS. 10 to 14 are diagrams illustrating the relationship of engagement among the cartridge casing member 1, the shutter 7, and the spring members 25.

Figure 10:
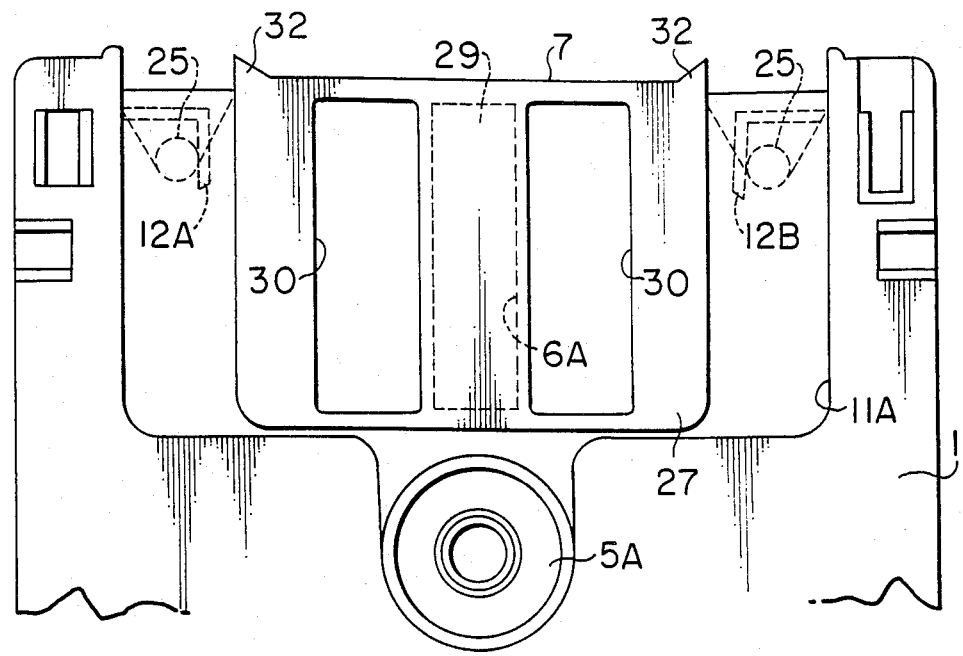

As shown in FIG. 10, the shutter 7 is disposed substantially in the center of the cartridge casing member 1 in such a manner as to close the head entry apertures 6A, 6B of the cartridge casing member 1 by the closing cover portions 29, 29, respectively, and the spring members 25, 25 are respectively disposed on opposite sides of the shutter 7.

Figure 11:
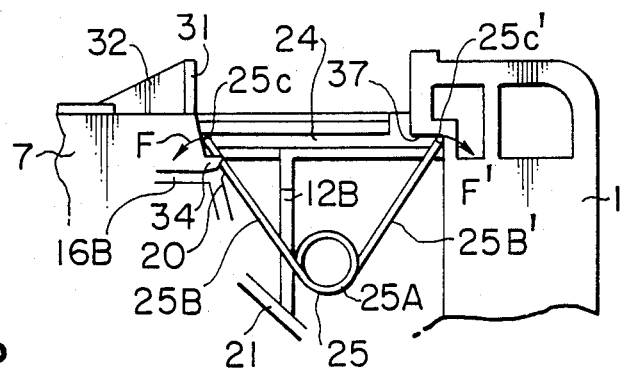
Figure 12:
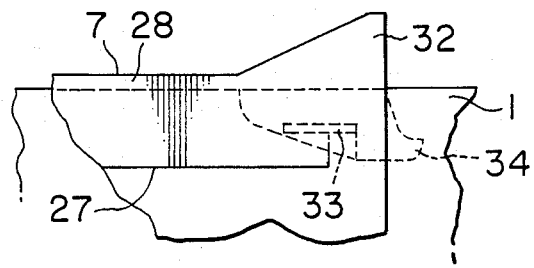

A state in which the spring member 25 is mounted in the spring accommodating portion 23 is shown in FIG. 11. In this drawing, one abutting portion 25C' of the spring member 25 is resiliently brought into contact with a spring-retaining stepped portion 37 in the recess 14A shown in FIG. 5, while the other abutting portion 25C of the spring member 25 is resiliently brought into contact with the spring retaining portion 34 of the shutter 7.

When the shutter 7 moves rightwardly in the FIG. 11, since the abutting portions 25C' 25C are engaged with the spring-retaining stepped portion 37 and the spring retaining or engaging portion 34 of the shutter 7 respectively, the spring member 25 is twisted and, as a whole, moves rightwardly, while coil portion 25A moves further downwardly. In addition, when the shutter 7 moves leftwardly in the FIG. 11, the torsional force exerted by the spring 25 is weakened and the torsion is thus released. At the same time, the shutter 7 as a whole moves leftwardly, while the coil portion 25A moves upwardly. Subsequently, when the shutter 7 arrives at the center of the shutter slide portions 11A, 11B (see FIGS. 1 and 3), the abutting portion 25C of the spring member 25 is brought substantially adjacent to the bent portion 20 of the wall 16B, but this abutting portion 25C is still in contact with the spring retaining portion 34 of the shutter 7. When the shutter 7 moves further leftwardly, the abutting portion 25C abuts against the bent portion 20 and is thereby disengaged from the spring retaining portion 34. As a result, the shutter 7 ceases to be biased leftwardly by the spring member 25, and is biased rightwardly by the other spring member disposed on the opposite side.

When the shutter 7 is located at the center of the shutter slide portions 11A, 11B, the coil portion 25A of the spring member 25 is held in contact with the abutting rib 12A-3 (FIG. 2). As a result, the coil portion 25A is prevented from moving leftwardly and upwardly, and its position is thereby fixed. When the position of the coil portion 25A is thus fixed, a counterclockwise biasing force F is generated to act on an arm 25B around the coil portion 25A, while a clockwise biasing force F' is similarly generated to act on the arm 25B'. Consequently, a force generally directed toward an innermost portion of the spring accommodating portions 23 acts on the overall spring member 25.

At the same time, since the counterclockwise and clockwise biasing forces F, F' acting on the arms 25B, 25B' have components which tend to separate the abutting portions 25C, 25C' from each other, the abutting portion 25C' is pressed against a corner or angular portion of the recess 14A, and the arm 25B or the abutting portion 25C thereof is thus pressed against the bent portion 20 or the side surface of the shutter 7.

By virtue of the above-described arrangement, there is no force acting on the spring member 25 in a direction from the spring accommodating portion 23 to the outside, so that, even if the slits 24, 24 (see FIG. 6) are opened, the spring members 25, 25 do not spring out from the spring accommodating portions 23, 23.

Description will now be given of a means of mounting or installing the shutter 7 and the spring member 25 in the cartridge casing member 1.

First, the spring member 25 is inserted through the slit 24 of the cartridge casing member 1 and is released. In other words, in FIG. 15, the spring member 25 is inserted into the spring accommodating portion 23 through the slit 24 (see FIG. 6) by being guided by a spring portion inserting tool (not shown) in a state in which the arms 25B, 25B' are slightly compressed as indicated by imaginary lines. Upon completion of the insertion, one abutting portion 25C of the spring member 25 is engaged with a projection 40 provided on the side of the cartridge casing member 1, as shown by the imaginary lines in FIG. 15, and the abutting portion 25C is slightly deformed resiliently as a result. If the spring member 25 is released in this state, the spring member 25 is set to a state shown by solid lines by the reactionary resilient force of the spring member 25.

Figure 13:
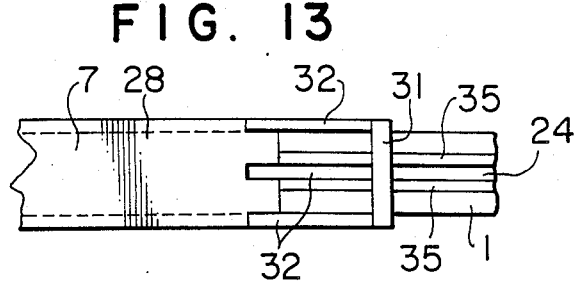
Figure 14:
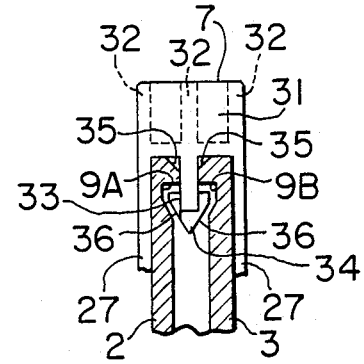
Figure 15:
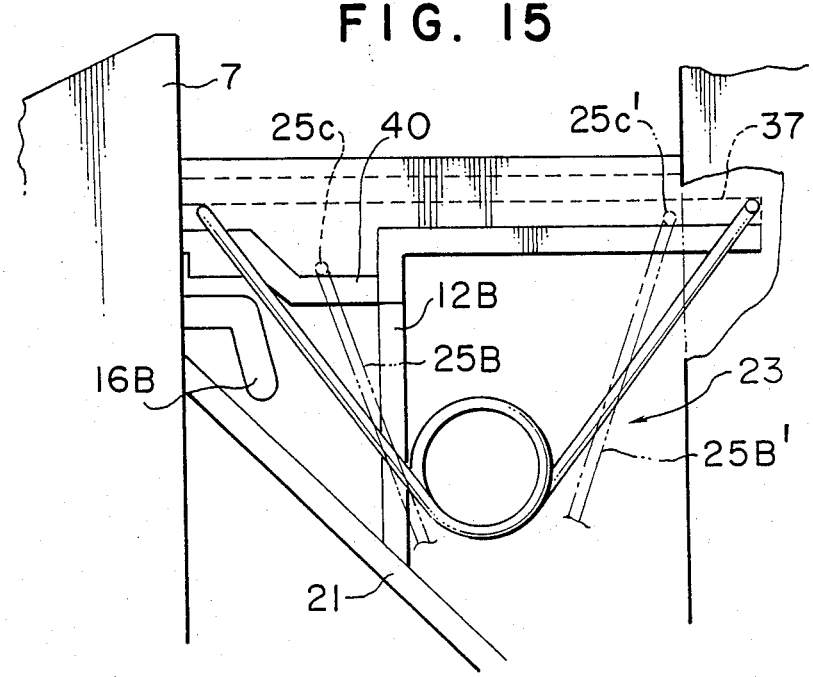

After the spring member 25 is thus set, the shutter 7 is mounted to the cartridge casing member 1 from a front surface portion thereof with the free open end of the shutter surface portions 27, 27 slightly widely opened. The engaging or retaining pawls 33 of the shutter 7 are then brought into contact with the open ends of the slits 24 in the cartridge casing member 1. As shown in FIGS. 13 and 14, slanting surfaces 35, 35 are formed on both sides of the open end of each slit 24, while, as shown in FIG. 14, tapers 36, 36, are formed at the tip of each of the retaining pawls 33. Accordingly, by virtue of the cooperation between these slanting surfaces 35, 35 and the tapers 36, 36, as well as the slight opening in the vicinity of the slits 24 in the upper and lower casing members 2, 3 and the resilient deformation of the retaining pawl 33, the retaining pawl 33 enters the slit 24 and is engaged with the guide grooves 9A, 9B of the upper and lower casing members 2, 3, as shown in FIG. 14. This engagement prevents the shutter 7 from being separated from the cartridge casing member 1, and the shutter 7 is guided in the sliding direction by the guide grooves 9A, 9B.

In addition, when the shutter 7 is mounted, the shutter 7 and each of the spring members 25 are engaged in the state shown in FIG. 11.

Figure 16:
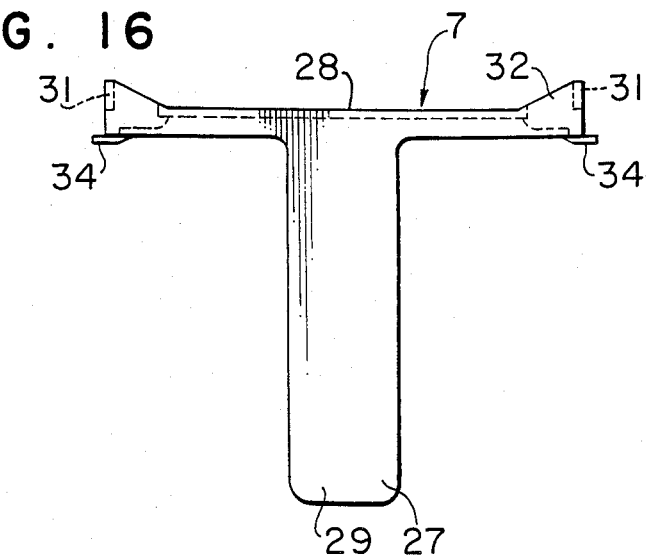
FIGS. 16 to 18 are a top plan view, an end plan view, and a side elevational view, respectively, of a modified example of the shutter.
Figure 17:
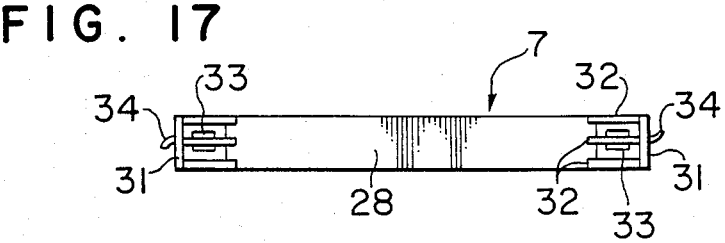
Figure 18:
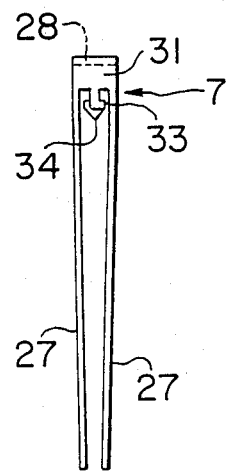

FIGS. 16 to 18 illustrate a modified example of the shutter 7. As is apparent from FIG. 16, the shutter 7 in accordance with this modified example differs from that shown in FIGS. 7 to 9 in that each of the shutter surface portions 27, 27 is constituted by a single closing cover portion 29 alone, and the planar configuration of the shutter 7 is substantially T-shaped. Since the other arrangements are the same as those of the foregoing embodiment, detailed description thereof is omitted.

FIGS. 19 to 30 are diagrams illustrating a second embodiment of the present invention.

Figure 19:
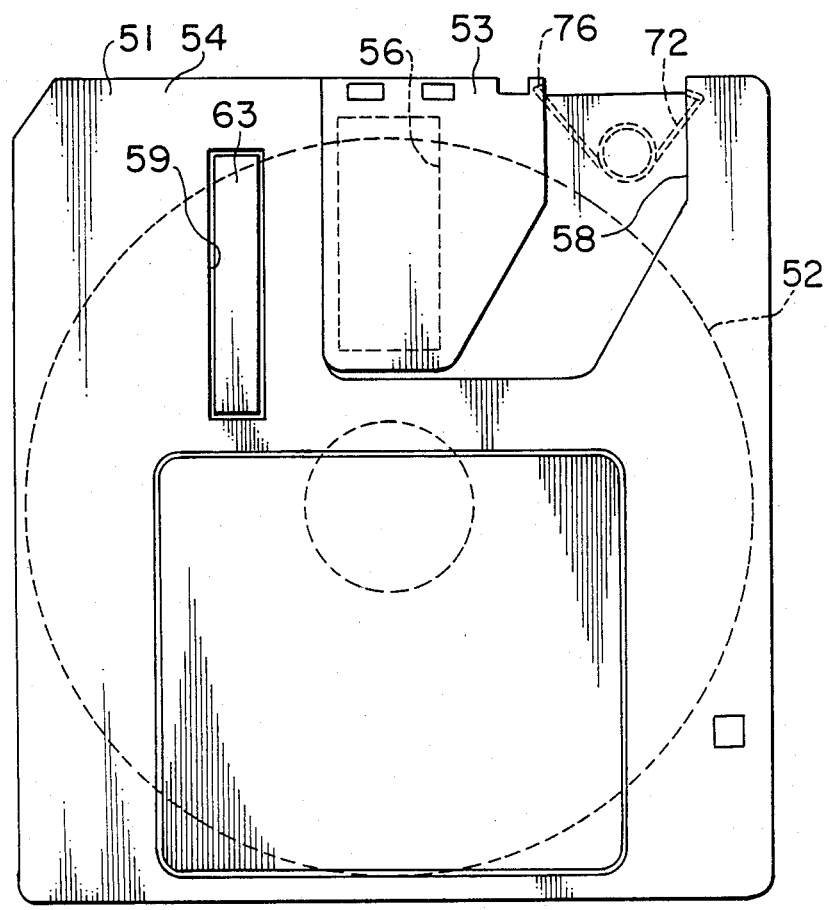
Figure 20:
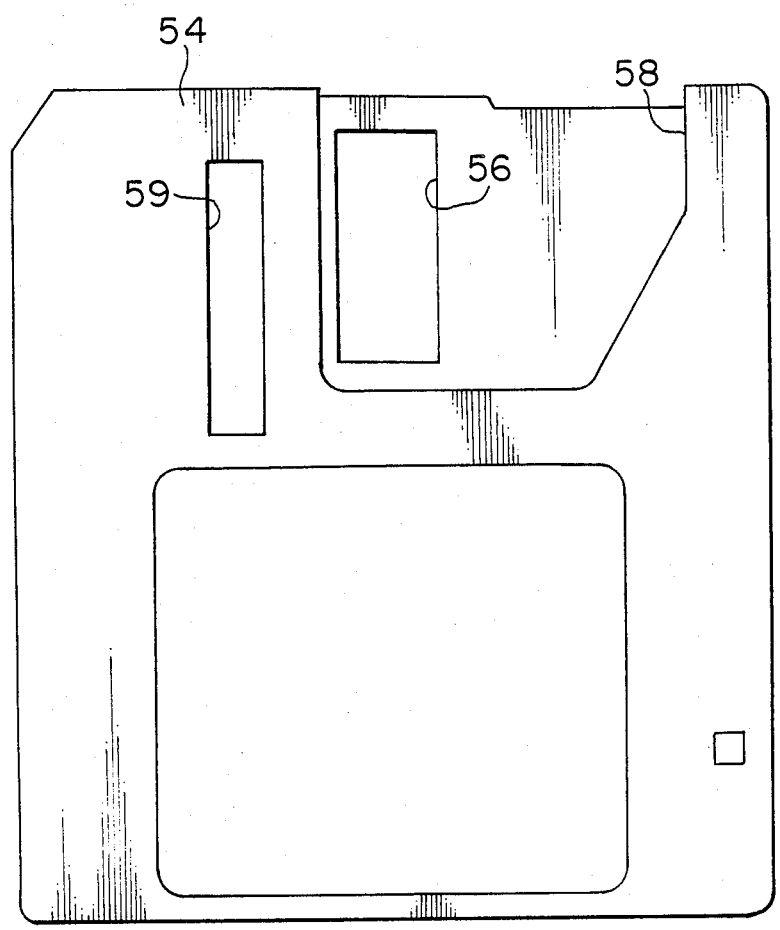
Figure 21:
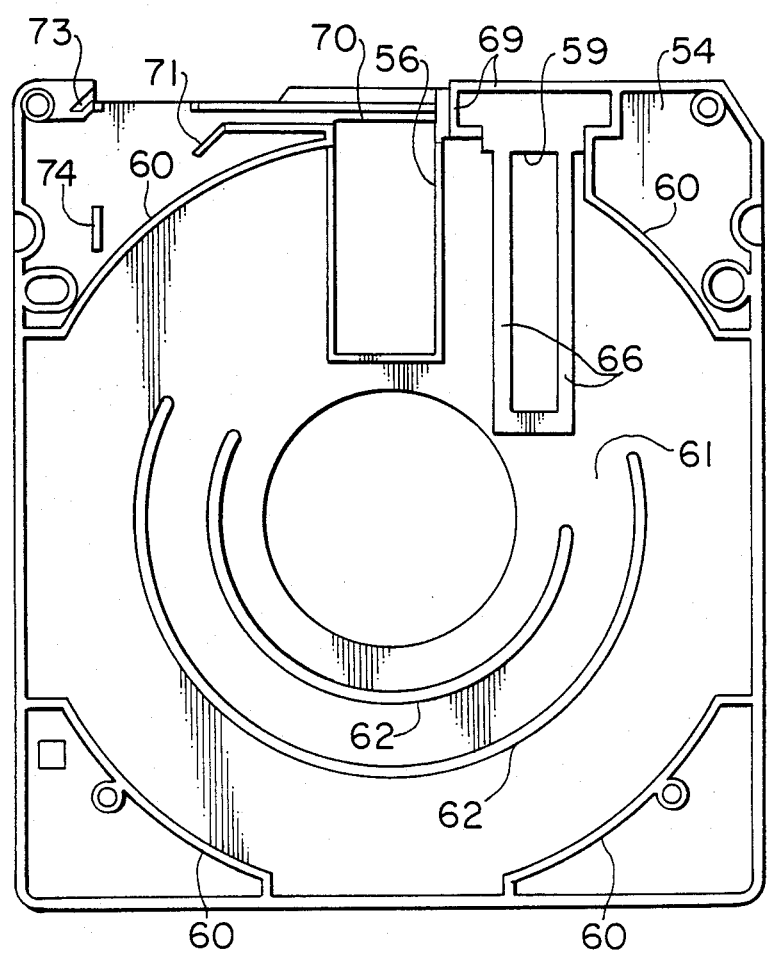
Figure 22:
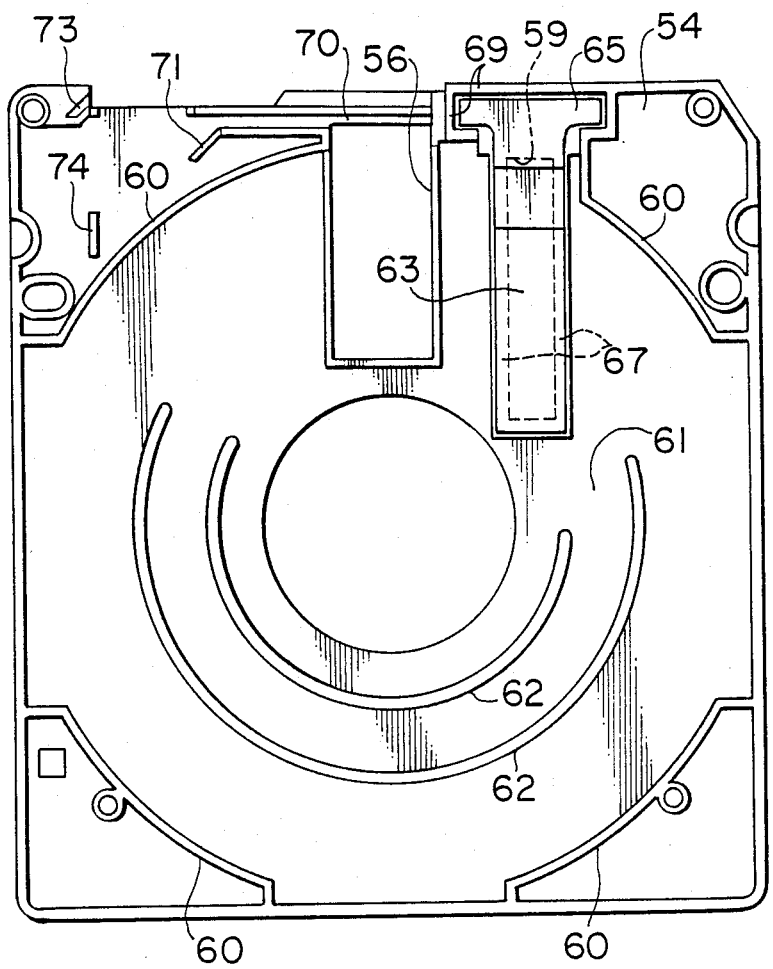
Figure 23:
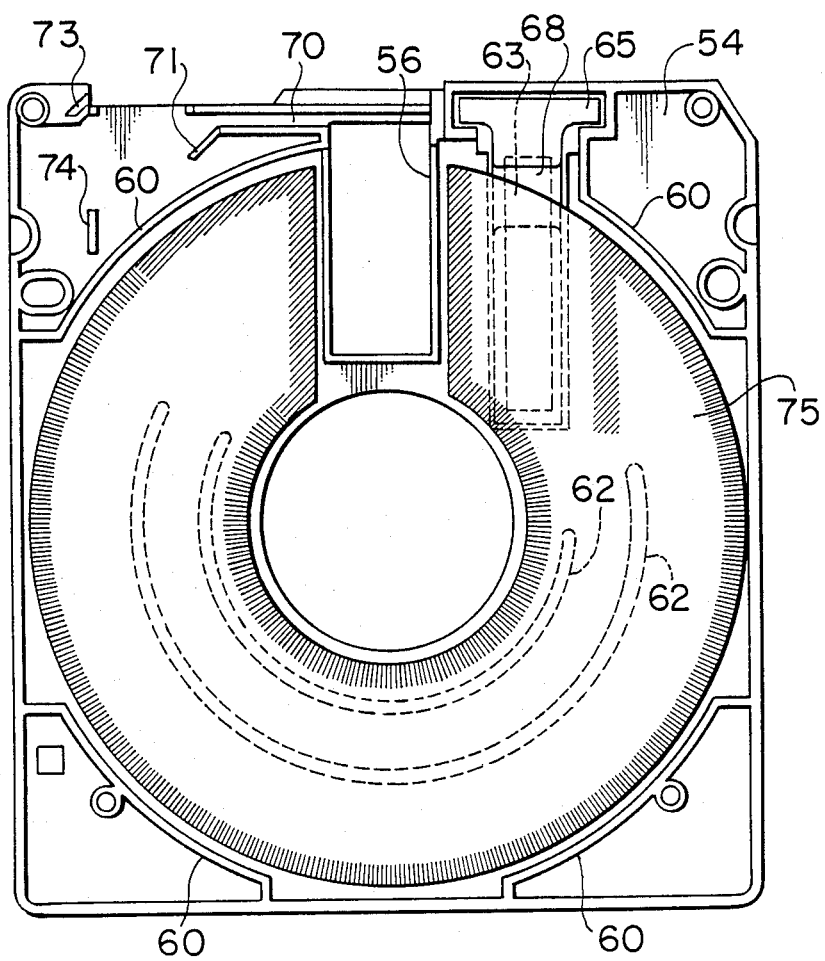
Figure 24:
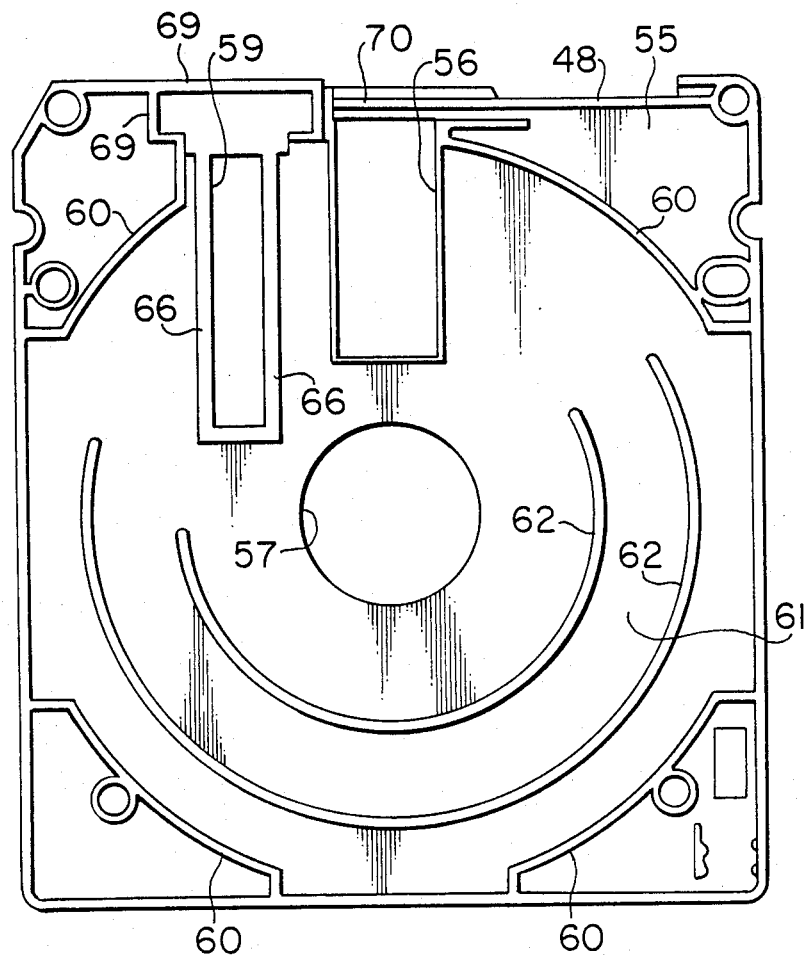
Figure 25:
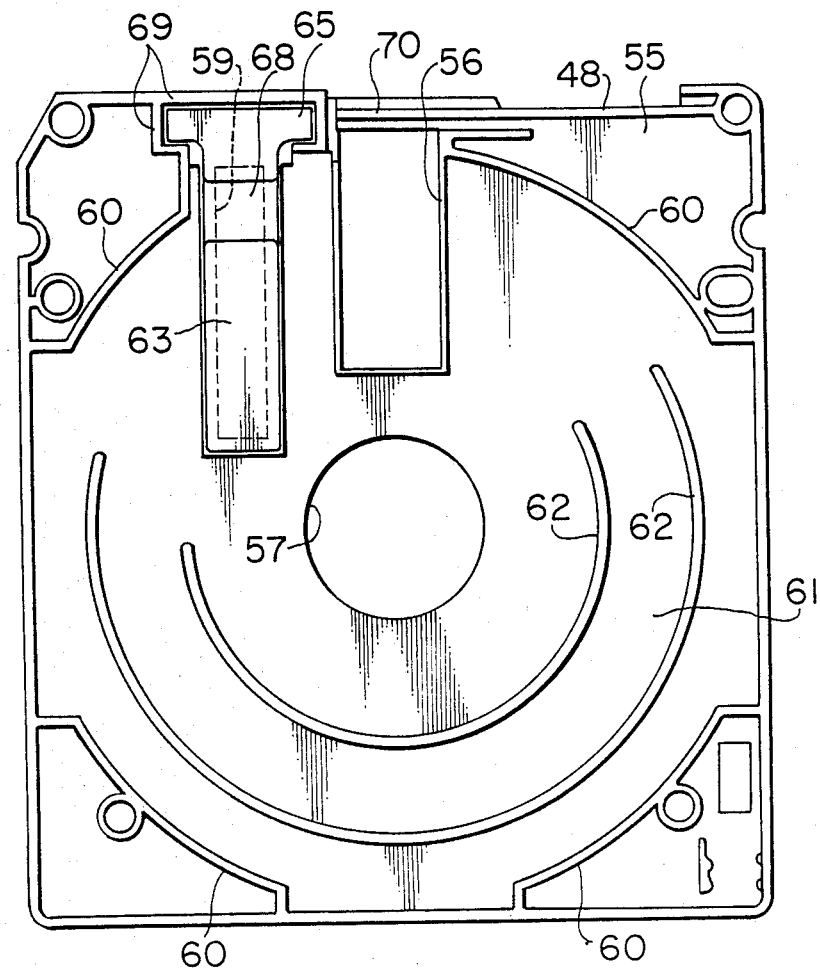
Figure 26:
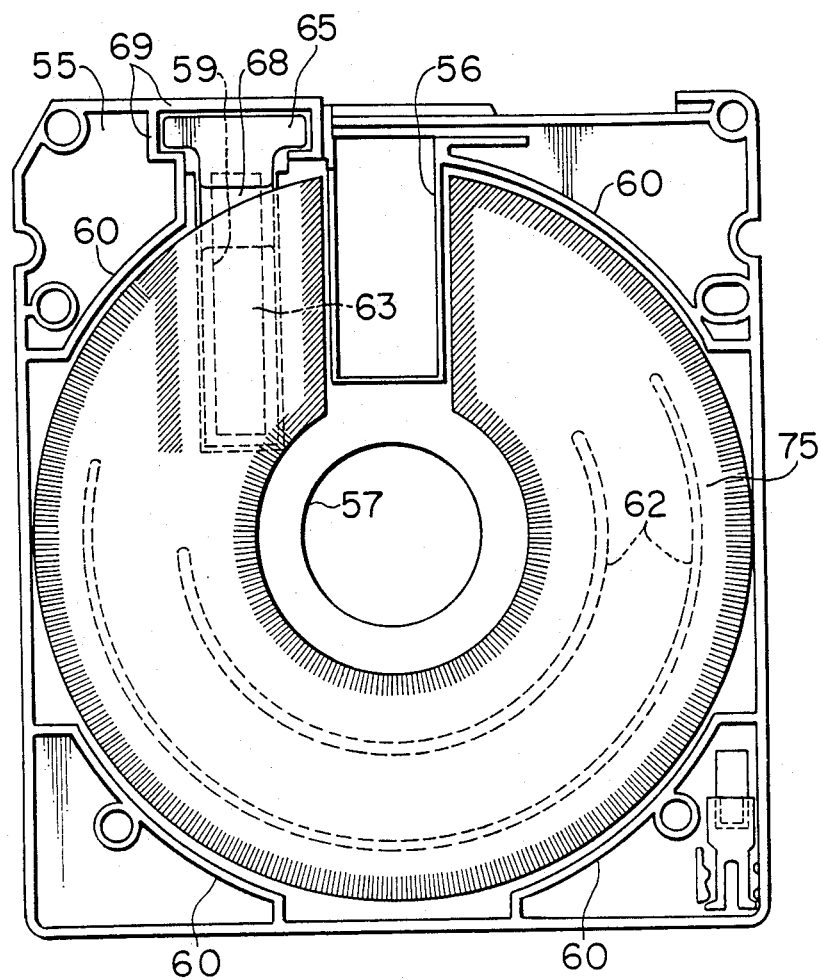
Figure 27:
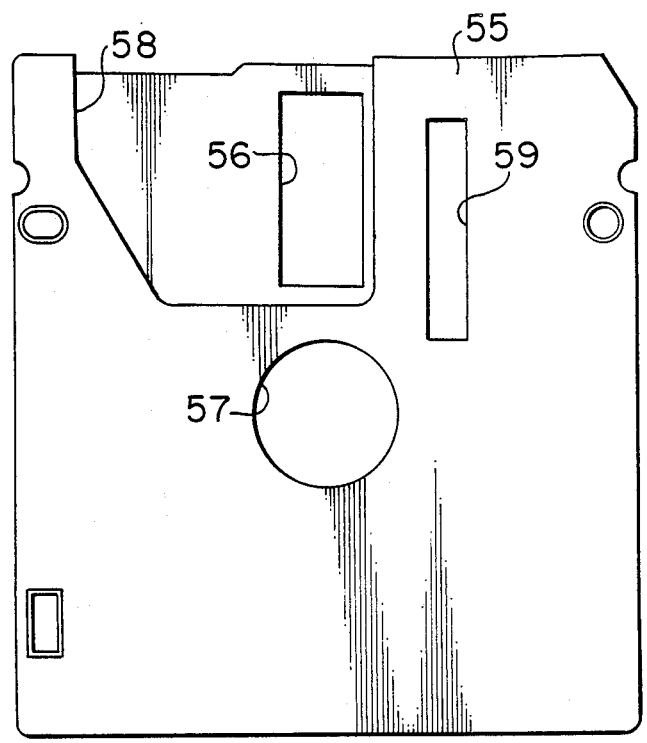
Figure 30:
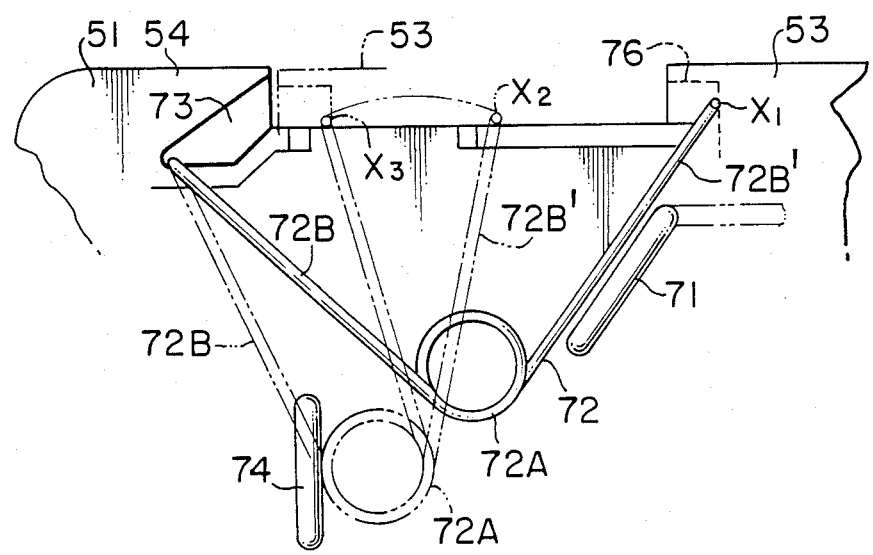
Figure 28:
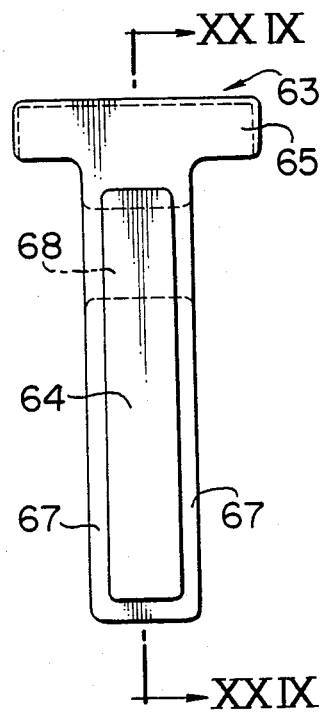
Figure 29:
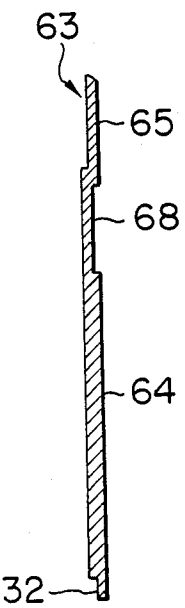

FIG. 19 is a top plan view of the disk cartridge in accordance with this embodiment; FIG. 20 is a top plan view of the upper casing member used for the disk cartridge; FIG. 21 is a bottom plan view of the upper casing member; FIG. 22 is a bottom plan view of the upper casing member with a pressing plate mounted thereon; FIG. 23 is a bottom plan view of said upper casing member with a cleaning sheet further provided thereon; FIG. 24 is a top plan view of the lower casing member; FIG. 25 is a top plan view of the lower casing member with the pressing plate mounted thereon; FIG. 26 is a top plan view of the lower casing member with the cleaning sheet further provided thereon; FIG. 27 is a bottom plan view of the lower casing member; FIG. 28 is a top plan view of the pressing plate; FIG. 29 is a cross-sectional view taken along the line XXIX—XXIX of FIG. 28; and FIG. 30 is a diagram illustrating states of displacement of the spring member accompanying the opening/closing operation of the shutter.

In the same way as the first embodiment, the disk cartridge (FIG. 19) is mainly comprised of a cartridge casing member 51, a recording medium 52 in the form of a disk rotatably accommodated therein, and a shutter 53 slidably supported by the cartridge casing member 51.

The cartridge casing member 51 comprises an upper casing member 54 and a lower casing member 55, which are formed of a hard synthetic resin such as ABS resin.

Rectangular head entry apertures 56 are respectively provided in the upper and lower casing members 54, 55 such as to be located in the vicinity of one side of the cartridge casing member 51. In addition, as shown in FIGS. 24 to 27, a circular spindle hole 57 is formed substantially in the center of the lower casing member 55. Slightly recessed shutter slide portions 58, 58, each having a substantially trapezoidal shape in terms of their planar configuration are formed in the upper and lower casing members 54, 55 in the vicinity of the front surfaces thereof to restrict the sliding range of the shutter 53. The head entry apertures 56 are respectively provided in these shutter slide portions 58, 58.

As shown in FIG. 20, a rectangular press plate insert port or aperture 59 is formed substantially parallel with and adjacent to the head entry aperture 56 in the upper casing member 54 upstream in the rotating direction of the disk. As shown in FIG. 21, a disk accommodating portion 61 is formed inside restricting ribs 60 respectively provided at the four corners on the inner surface of the upper casing member 54, and this disk accommodating portion 61 substantially corresponds to a rotational area of the disk 52. Arcuate ribs 62 are formed substantially concentrically, at a region where apertures 56, 59 are not formed, around the rotational center of the recording medium 52 accommodated in the disk accommodating portion 61 such as to be disposed inside the disk accommodating portion 61.

A pressing plate 63, shown in detail FIGS. 28 and 29, is inserted into the press-plate insert port 59. This pressing plate 63, for pressing the cleaning sheet 70 against the disk 52, is formed of a synthetic resin, and comprises a rectangular pressing portion 64, having substantially the same configuration as that of the plate insert port 59, as well as an extending portion 65 provided at one end of the pressing portion 64, as shown in FIG. 28, and is T-shaped in terms of its planar configuration. A collar 67, which engages with a stepped portion 66 (see FIGS. 21 and 24) at the periphery of the plate insert port 59, is provided at the periphery of the pressing portion 64. Also, as shown in FIGS. 28 and 29, a recess 68 is formed in the pressing portion 64 in the vicinity of its junction with the extending portion 65 and at a position to be opposed to the periphery of the recording medium 52 so as to provide an escaping portion.

As shown in FIGS. 21 and 24, a displacement-preventing rib 69, which engages with the extending portion 65 of the pressing plate 63, is formed on the outside of the port 59 in each of the upper and lower casing members 54, 55.

As shown in FIGS. 21 and 24, guide grooves 70 with which an engaging pawl (not shown) provided inside of the shutter 53 engages, are formed forwardly of the head entry apertures 56 of the upper and lower casing members 54, 55. In addition, as shown in FIG. 21, an inclined returning rib 71 is provided projecting rearwardly of the guide groove 70 in the upper casing member 54. An inclined recess 73, with which one end of an arm 72B of a spring member 72 (FIG. 19) engages, is formed at a left-hand corner, as viewed in FIG. 21, of the upper casing member 54. A falling-in-preventing rib 74 is provided substantially parallel with the longitudinal direction of the head entry aperture 56, i.e., in a direction perpendicular to the sliding direction of the shutter 53. A portion of the front surface of the upper casing member 54 in front of the falling-in-preventing rib 74 is open to allow the spring member 72 to be inserted therethrough.

As shown in FIGS. 22 and 25, when the pressing plates 63 are inserted through the press plate insert ports 59 of the upper and lower casing members 54, 55, the pressing portion 64 of each pressing plate 63 is disposed in the rotational area of the disk-like recording medium 52, and, at the same time, the collar 67 of each pressing portion 64 engages with the stepped portion 66 of the respective insert port 59, thereby preventing the pressing portion 64 from coming off. In addition, the extending portion 65 is inserted in side of the respective rib 69, so that the displacement of the pressing plate 63 can be prevented.

After the pressing plate 63 is inserted into the port 59, a cleaning sheet 75, having substantially the same configuration as that of the disk accommodating portion 61 and formed of mixed filter of, for instance, polyethylene terephthalate and rayon, is placed in the disk accommodating portion 61, and its peripheral portion is partially fusion bonded to the upper or lower corresponding casing member 54, or 55.

The upper and lower casing members 54, 55, thus having the pressing plates 63, 63 and the cleaning sheets 75, 75, are superposed, with the disk recording medium 52 placed in between them, and after they are integrally bonded, the shutter 53 and the spring members 72, 72 are consecutively placed or inserted, as shown in FIG. 19. During the insertion of the spring member 72, a part of the spring member comes into contact with the rib 71 and is thereby returned, with the result that the spring member 72 can be set at a proper position.

The position of the spring member 72, shown by solid lines in FIG. 30, corresponds with a state in which the head entry aperture 56 is closed by the shutter 53. In this state, a coil portion 72A is spaced from the falling-in-preventing rib 74, and an end portion of the arm 72B is inserted into the recess 73 formed at the corner portion of the upper casing member 54, while the other arm 72B is at the position $X_1$, being resiliently brought into contact with a spring retaining portion 76 of the shutter 53.

In this state, if the shutter 53 is slid leftwardly in FIG. 30, the distance between the arms 72B and 72B' is gradually reduced, and, at the same time, the coil portion 72A is displaced toward the side of the rib 74. When the arm 72B' reaches the position $X_2$, the coil portion 72A abuts against the side surface of the rib 74, and as the shutter 53 continues to be slid further leftwardly, only the arm 72B' is substantially rotated around the coil portion 72A as a fulcrum, as shown by the imaginary lines. When the end of the arm 72B' reaches the position $X_3$, the shutter 53 is located at its leftward limit, with the result that the head entry aperture 56 is opened completely. When returning the shutter 53 to the right-hand side from this state, the spring member 72 moves oppositely to the above-described manner and resiliently biases the shutter 53 in the closing direction, making it possible to close the head entry aperture 56.

During an operation of opening/closing the shutter 53, the coil portion 72A of the spring member 72 abuts against the rib 74 and one arm 72B' undergoes arcuate or swinging motion around the abutting part of the coil portion 72A with the rib 74. At the same time, since the movement of the other arm 27B of the spring member 72 is restricted by the rib 74, the falling in of the spring member 72 can be prevented positively.

Figure 31:
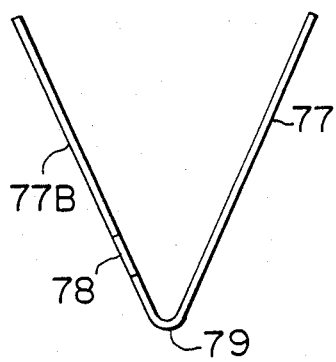
FIGS. 31 and 32 are, respectively, a top plan view and a left-hand side elevational view of a modified example of the spring member.
Figure 32:
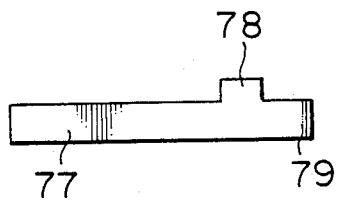
Figure 33:
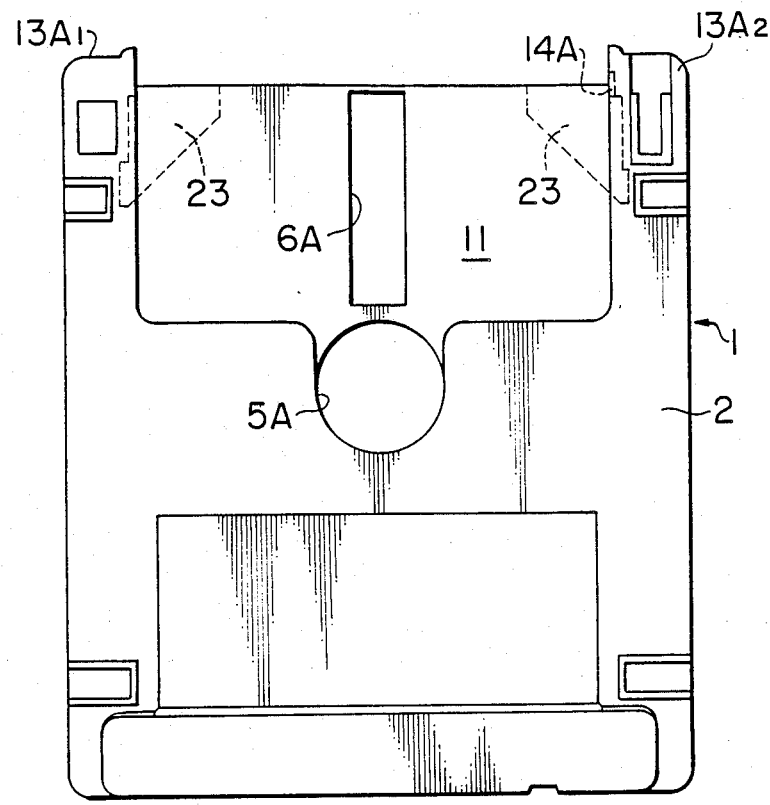
FIGS. 33 and 34 are, respectively, a top plan view and a front elevational view of a conventional cartridge casing.
Figure 34:
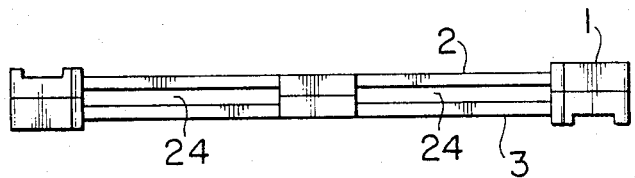
Figure 35:
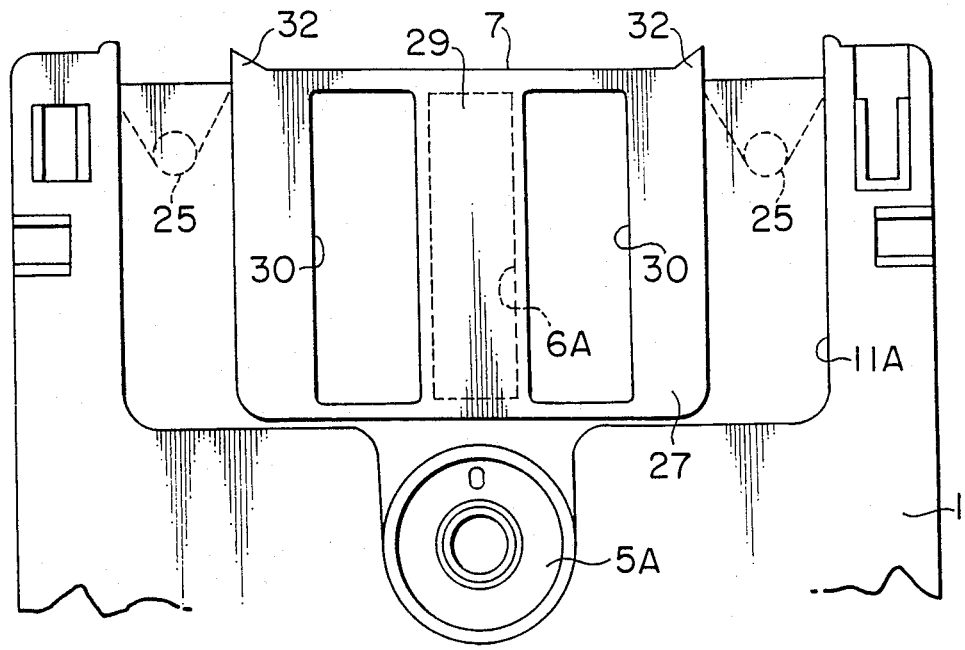
FIG. 35 is an enlarged fragmentary top plan view of the conventional disk carftridge.

FIGS. 31 and 32 show a modified example of the spring member. In this example, a leaf spring, bent in a V-shape, is used as the spring member 77, and a projection 78 is formed on one arm 77B in the vicinity of a bent portion 79 thereof. This projection 78 performs a function substantially similar to that of the coil portion 72A of the second embodiment described above, and is adapted to engage with a rib or a stepped portion (not shown) provided on the cartridge casing member at the time of opening/closing of the shutter.

Although a projection for preventing the springing out of the spring member is provided in the first embodiment and a projection for preventing the falling in of the spring member is provided in the second embodiment, both projections may be provided on the cartridge casing member.

Also, it should be noted that although, in the foregoing embodiments, the projection for preventing the springing out or falling in of the spring member is formed integrally on the cartridge casing member, the present invention is not restricted to the same, and a member for preventing the springing out or falling in of the spring member may be provided separately from the cartridge casing member and may be mounted on the internal surface of the cartridge casing member detachably if desired.

As has been described above, in accordance with the present invention, since it is possible to prevent the spring member from springing out or falling in, it is possible to provide a highly reliable disk cartridge which is capable of facilitating assembly work.

What is claimed is:

1. A disk cartridge comprising a cartridge casing member having a head entry aperture; a disk recording medium rotatably accommodated within said cartridge casing member; a shutter for opening/closing said head entry aperture, said shutter including two wall portions forming a substantially L-shaped corner of said shutter; and a spring member for resiliently biasing said shutter in the closed position, said spring member including a proximal end portion engaged with said cartridge casing member, a second end portion abutting against and supported by said two wall portions of said shutter in opposition to the resilient force of said spring member, and an intermediate portion between said proximal end portion and said second end portion; said cartridge casing member having an internal surface with a projection protruding therefrom to form a displacement-preventing portion in an area within said cartridge casing member through which said intermediate portion passes during opening or closing of said shutter, said intermediate portion being adapted to be brought into contact with said displacement-preventing portion so as to restrict the movement of said intermediate portion when said shutter is moved between the open position and the closed position, said projection cancelling any tendency of said spring member to spring out of or to fall into the interior of said cartridge casing member, through an open side of said L-shaped corner, as said shutter is moved from the open position to the closed position.

2. A disk cartridge according to claim 1, wherein said projection is formed integrally with said internal surface of said cartridge casing member.

3. A disk cartridge according to claim 1, wherein said spring member is a torsion coil spring, and said intermediate portion is a coil portion thereof.

4. A disk cartridge according to claim 1, wherein an abutting surface of said protrusion is perpendicular to the direction of movement of said shutter between the open position and the closed position.

5. A disk cartridge comprising a cartridge casing member having a head entry aperture; a disk recording medium rotatably accommodated within said cartridge casing member; a shutter for opening/closing said head entry aperture, said shutter including two wall portions forming a substantially L-shaped corner of said shutter; and a spring member for resiliently biasing said shutter in the closed position, said spring member including a proximal end portion engaged with said cartridge casing member, a second end portion abutting against and supported by said two wall portions of said shutter in opposition to the resilient force of said spring member, and an intermediate portion between said proximal end portion and said second end portion; said cartridge casing member having an internal surface with a projection protruding therefrom to form a first displacement-preventing portion and an internal surfaced with a second projection protruding therefrom to form a second displacement-preventing portion, said first and second displacement-preventing portions being in an area within said cartridge casing member through which said intermediate portion passes during opening or closing of said shutter, said intermediate portion being adapted to be brought into contact with said first displacement-preventing portion so as to restrict the movement of said intermediate portion when said shutter is moved from the open position to the closed position and into contact with said second displacement-preventing portion so as to restrict the movement of said intermediate portion when said shutter is moved from the closed position to the open position, said projections cancelling any tendency of said spring member to spring out of or fall into the interior of said cartridge casing member, through an open side of said L-shape corner, as said shutter is moved between the open position and the closed position.

6. A disk cartridge according to claim 5, wherein each projection is formed integrally with its associated internal surface.

7. A disk cartridge according to claim 5, wherein said spring member is a torsion coil spring, and said intermediate portion is a coil portion thereof.

8. A disk cartridge according to claim 5, wherein an abutting surfaces of said protrusions are perpendicular to the direction of movement of said shutter between the open position and the closed position.

* * * * *